(12) United States Patent
Tyllilä

(10) Patent No.: US 6,638,420 B2
(45) Date of Patent: Oct. 28, 2003

(54) APPARATUS FOR SEWAGE TREATMENT

(75) Inventor: Pekka Tyllilä, Espoo (FI)

(73) Assignee: Evac International Oy, Helsinki (FI)

( * ) Notice: Subject to any disclaimer, the term of this patent is extended or adjusted under 35 U.S.C. 154(b) by 0 days.

(21) Appl. No.: 10/081,358

(22) Filed: Feb. 22, 2002

(65) Prior Publication Data

US 2002/0139739 A1 Oct. 3, 2002

(30) Foreign Application Priority Data

Mar. 27, 2001 (FI) .............................................. 20010628

(51) Int. Cl.[7] .................................................. C02F 3/20
(52) U.S. Cl. ......................... 210/86; 210/104; 210/109; 210/116; 210/123; 210/143; 210/220; 210/242.2; 210/532.2
(58) Field of Search ............................. 20/86, 104, 109, 20/116, 123, 143, 220, 242.2, 532.2

(56) References Cited

U.S. PATENT DOCUMENTS

| 3,655,050 | A |   | 4/1972  | Fifer |
| 3,799,346 | A |   | 3/1974  | Freese |
| 3,859,215 | A | * | 1/1975  | Milne ..................... 210/170 |
| 3,879,290 | A |   | 4/1975  | Arnot, Jr. |
| 3,920,550 | A | * | 11/1975 | Farrell et al. .................. 210/86 |
| 4,253,957 | A |   | 3/1981  | Sullivan |
| 4,516,281 | A |   | 5/1985  | MacPherson et al. |
| 5,011,605 | A |   | 4/1991  | Pape et al. |
| 5,647,986 | A |   | 7/1997  | Nawathe et al. |
| 5,766,475 | A | * | 6/1998  | Mayer et al. ................ 210/605 |
| 6,200,470 | B1 | * | 3/2001 | Romero et al. ............. 210/170 |
| 6,200,472 | B1 | * | 3/2001 | Donald et al. ........... 210/195.1 |

FOREIGN PATENT DOCUMENTS

| DD | 220 292 A1 | 3/1985 |
| EP | 0 764 611 A3 | 5/1998 |

OTHER PUBLICATIONS

Copy of European Search Report for Application No. 02003049.0–2104–, dated Jul. 5, 2002.
Copy of second Office Action for Finnish Application No. 20010628, dated Jun. 11, 2002.

* cited by examiner

Primary Examiner—Chester T. Barry
(74) Attorney, Agent, or Firm—Marshall, Gerstein & Borun LLP

(57) ABSTRACT

Apparatus for treatment of sewage on vessels. The apparatus includes at least a first aeration chamber, a settling chamber, a disinfection chamber, and a storage container. In order to provide a multifunctional and efficient apparatus, the aeration chamber, the settling chamber, the disinfection chamber, and the storage container are integrated into the same structure.

16 Claims, 4 Drawing Sheets

APPARATUS FOR SEWAGE TREATMENT

FIELD OF THE INVENTION

The invention generally relates to sewage treatment apparatus and, more particularly, to sewage treatment apparatus for use on vessels, such as marine vessels.

BACKGROUND OF THE INVENTION

Sewage or waste water treatment plants are generally known. It is also known to provide such apparatus on marine vessels. In marine applications, the capacity of the treatment plant is typically sized according to the number of persons carried by the vessel, whereby, for example, sewage treatment plants on passenger ships and freighters are of a totally different size category.

In the following both the terms sewage and waste water are used. These terms comprise waste from sanitary installations, such as toilets, urinals, wash basins, hospitals, and sick bays, as well as kitchens, food stuff treatment facilities, and the like. Other terms used in this connection are black water and grey water, as are generally understood in the art.

A typical apparatus for sewage treatment comprises as basic components an aeration chamber, a settling chamber, and a disinfection chamber for the sewage. In the aeration chamber the organic components of the sewage are transformed by means of bacteria into carbon dioxide and water. The air necessary for the process is usually produced by blowers. From the aeration chamber, the treated waste water is led to the settling chamber, from where the separated sediment is returned back to the aeration chamber for further disintegration. From the settling chamber, the cleared water is led to the disinfection chamber, where disinfection is carried out either chemically and/or by UV-light or UV-radiation. From the disinfection chamber, the cleaned water can be emptied into the sea, a receiving facility on land, such as a sewer network, or into a storage container at some other location aboard the vessel.

In known waste water treatment plants intended for use on ships, the aeration chamber, settling chamber, and disinfection chamber form a separate entity, wherein short transfer connections are installed between the chambers, and whereby the fluid is arranged to flow from one chamber to another by way of overflow. The treatment plant is usually preceded by a collecting container which has the function of guaranteeing a stable load for the treatment plant at all hours of the day. A storage container is often arranged after the treatment plant and clearly separated from the same, having the function of storing the waste water cleaned aboard the vessel at times when it cannot be discharged into the sea due, for example, to different regulations, such as into a harbor basin when the vessel is in a harbor.

In known apparatus the storage container is always a container situated apart form the treatment plant and often arranged at the bottom of the hull, whereas the treatment plant is placed in the machine room, and therefore the transfer connections from the treatment plant to the storage container are long, thereby increasing the possibility of leaks in the connecting piping. Furthermore, in conventional apparatus, each system needs its own pumping station and level metering system, including control automation.

SUMMARY OF THE INVENTION

In view of the foregoing, an apparatus for the treatment of sewage is described herein which provides for an efficient and multifunctional sewage treatment process by simple means, while avoiding the aforementioned disadvantages.

In this regard, the sewage treatment plant and the storage container intended for use on a ship are provided, as much as possible, as an integrated structure, whereby the means necessary for the transfer connections and the control of the same can be minimized and whereby an efficient as possible interaction can be achieved between the different components of the apparatus. Accordingly, the aeration chamber, the settling chamber, the disinfection chamber, and the storage container are integrated in the same structure, whereby at least the level metering system, the pumping station, and the control center can be combined into one unit, i.e. having the process and its control monitored from a central arrangement. The disinfection chamber and the storage container can be arranged as separate units and provided with surface level sensors connected to a control center. This provides for a controlled temporary storage stage when direct discharge of treated waste is not possible.

The storage container can also be arranged directly as a fixed part of the structure of the treatment plant, whereby the disinfection chamber, for example, may be expanded from being only a disinfection chamber into a multifunctional combined disinfection chamber-storage container. The combined control of this arrangement may advantageously be provided with surface level sensors connected to a control center.

At the aeration stage preferably two (i.e. a first and a second) aeration chambers are used in order to optimize the aeration stage.

To provide for alternative ways of treating sewage, the first aeration chamber and the storage container may be provided with sewage supply pipes connected to the source of sewage. This means, for example, that the sewage treatment process may also temporarily be by-passed, such as during annual maintenance, whereby the sewage can be collected directly in the storage container, from where the sewage can be returned to the aeration chamber for treatment to be carried out later. The treatment process can thus be finished after annual maintenance or some other interruption.

It has also shown to be advantageous that the sewage supply pipes connected to the first aeration chamber and the storage container be further connected to an ejector device when the apparatus is employed in connection with a vacuum waste system.

The above mentioned arrangements further provide for both the aeration chamber and the storage container to function directly as a collecting container for sewage.

The disinfection chamber and the storage container may be advantageously provided with a common pump means connected to the control center in order to further centralize the arrangement.

The disinfection chamber may be advantageously provided with a disinfection system comprising a disinfectant container and a dosage pump connected to the control center as noted above.

The integrated structure of the device according to the invention provides for connecting all the operating means to the central control center.

Other features and advantages are inherent in the embodiments claimed and disclosed, or will become apparent to those skilled in the art from the following detailed description and accompanying drawings.

DETAILED DESCRIPTION

Figure 1:
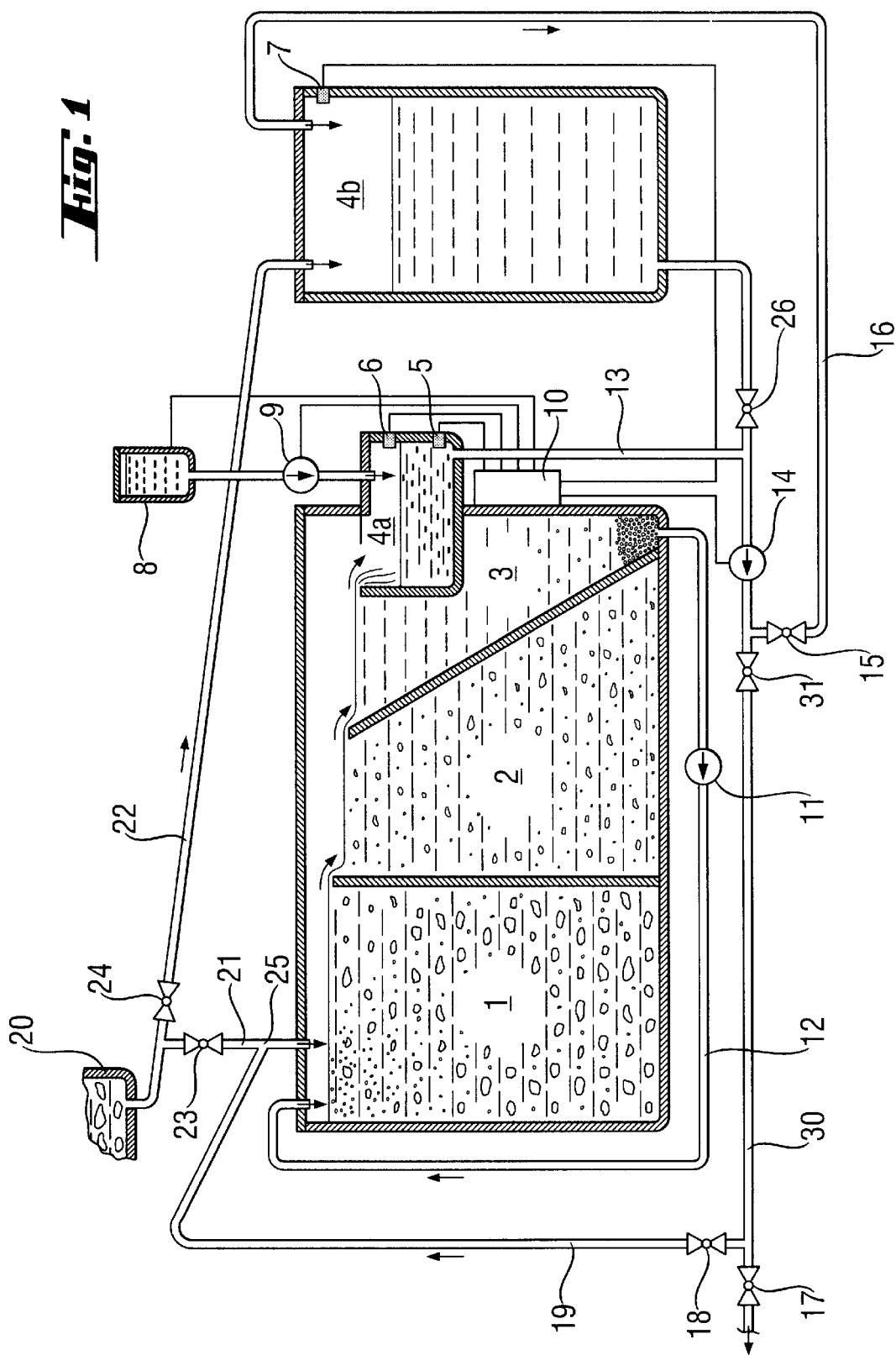
FIG. 1 is a partially schematic side elevation view showing one embodiment of a system in accordance with the teachings of the present invention, in which a disinfection chamber and a storage container are arranged as separate units.

A first embodiment of a sewage or waste water treatment plant is shown in FIG. 1 having a first aeration chamber 1 and a second aeration chamber 2. Next to the second aeration chamber 2 is arranged a settling chamber 3, in the immediate vicinity of which is arranged a disinfection chamber 4a, which is provided with a lower first surface level sensor 5 and an upper second surface level sensor 6. The apparatus further comprises a disinfection system, whereby dosage of disinfectant takes place from a disinfectant container 8 by means of a dosage pump 9. The function of the surface level sensors and the dosage of disinfectant are controlled by a control center 10.

A storage container 4b is integrated into the treatment plant, wherein it nonetheless forms a separate unit. The waste water is transferred from the disinfection chamber 4a to the storage container 4b through a pipe connection 13, 16. The storage container 4b is provided with a third surface level sensor 7 for monitoring the storage stage, which will be discussed below in more detail.

Untreated waste water is arranged to be supplied from a source of sewage 20 either to the first aeration chamber 1 through a supply pipe 21 or to the storage container 4b through a supply pipe 22. Treated waste water is discharged by a pump 14 from the storage container 4b into the sea or a storage facility on land, e.g. a sewer network (not shown). The waste water can also be returned through a pipe connection 19, 25 to the first aeration chamber 1.

In normal operation, the shut-off valve 23 is open and the shut-off valve 24 is closed, so that untreated waste water is supplied from the source of sewage 20 through the pipe 21 to the first aeration chamber 1. The waste water is subsequently transferred by way of overflow (shown by arrows) to the second aeration chamber 2 and further to the settling chamber 3, from where any undissolved particles may be returned to the first aeration chamber 1 through a pump 11 and a pipe 12 for renewed treatment. From the surface of the settling chamber 3 the waste water is transferred by way of overflow (shown by arrow) to the disinfection chamber 4a.

If the water can be discharged from the treatment plant directly e.g. into the sea or other receiving facility, i.e. no temporary storage is required, the actual disinfection process is controlled by the lower first surface level sensor 5 and the upper second surface level sensor 6. The central control center 10 also controls the supply of disinfectant from the disinfectant container 8 to the disinfection chamber 4a by the pump 9 by means of signals given by the surface level sensors 5,6. The discharge of cleaned waste water from the disinfection chamber 4a is carried out in a controlled manner through the discharge pipe 13 and the pump 14 to a discharge pipe 30, whereby shut-off valves 17 and 31 are open and shut-off valves 15, 18, and 26 are closed. The disinfection chamber 4a is usually of a smaller size (as schematically indicated in FIG. 1) and suitably sized for the disinfection process. Discharge from the disinfection chamber 4a is generally initiated by a signal from the upper second surface level sensor 6.

If the situation requires waste water to be stored for a certain time (e.g. when the ship is in the harbor), the waste water is led through the pipe connection 13, 16 to the storage container 4b, where the surface level of the collected waste water is controlled by a third surface level sensor 7. In this case shut-off valve 15 is open and shut-off valves 26, 31 are closed. This provides for a temporary storage stage as mentioned above, whereby the storage container 4b may be sized according to an estimated need. The filling and discharge of the storage container 4b is thus generally monitored by the third surface level sensor 7, which also is connected to the control center 10.

Waste water can also, when necessary, be returned from the storage container 4b to the first aeration chamber 1 through the pump 14 and the return pipe 19, which through a pipe connection 25 is connected to the sewage supply pipe 21. In this case shut-off valves 18, 26, and 31 are open and shut-off valves 15 and 17 are closed.

If it is desirable to by-pass the waste water treatment process, e.g. for maintenance or other reasons, waste water can be led from the source of waste water 20 through the supply pipe 22 directly to the storage container 4b. In this case the waste water can at a later stage be led from the storage container 4b to the first aeration chamber 1 as described in the above paragraph.

Waste water can also be led untreated from the storage container 4b directly into the sea or other receiving facility, e.g. a sewer network (not shown). Discharge into the discharge pipe 30 is carried out by the pump 14, whereby shutoff valves 17, 26, and 31 are open and shut-off valves 15 and 18 are closed.

Figure 2:
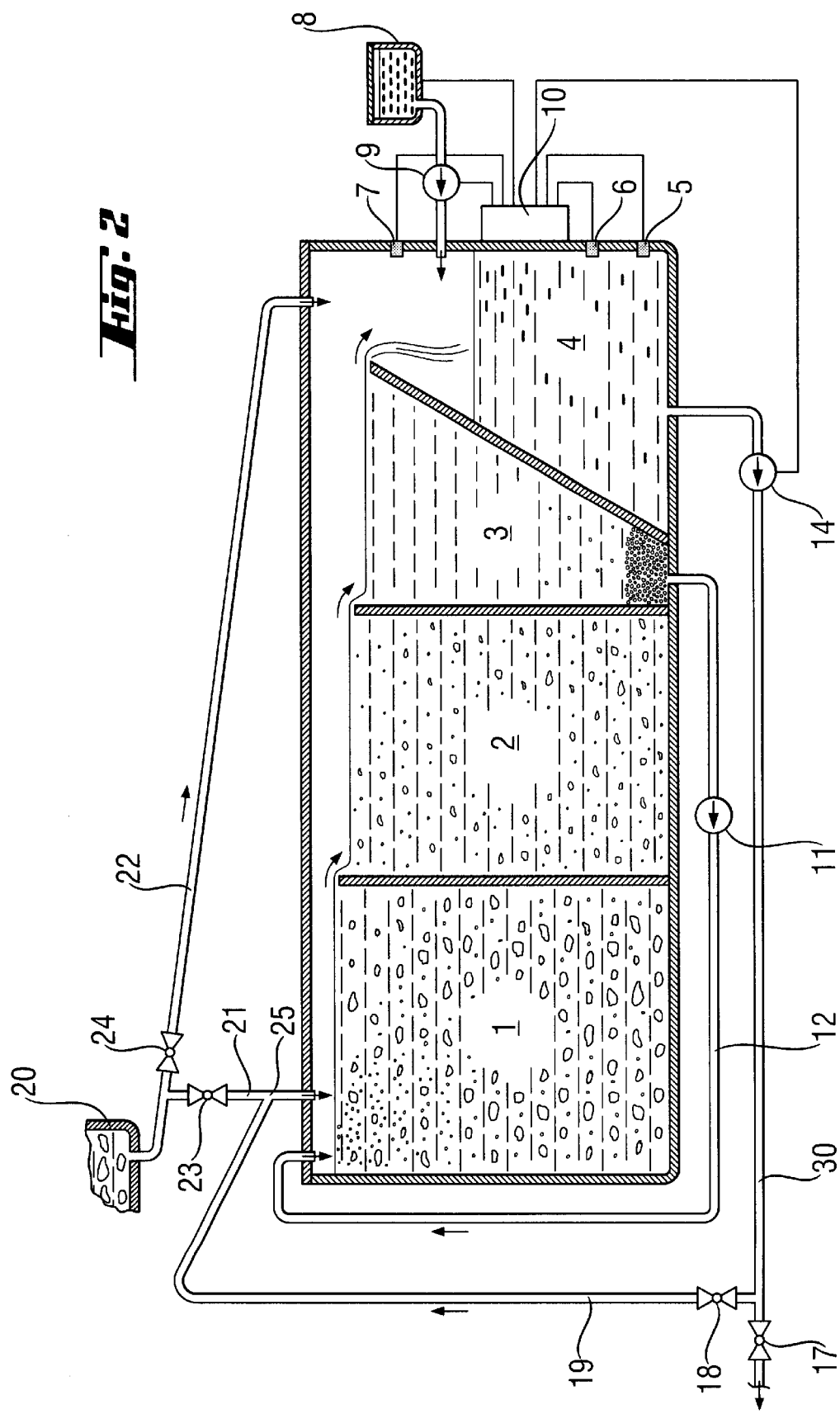
FIG. 2 is a partially schematic side elevation view showing another embodiment of a system in which a disinfection chamber and a storage container are arranged as an integrated unit.

An alternative embodiment of a sewage or waste water treatment plant is shown in FIG. 2 having a first aeration chamber 1 and a second aeration chamber 2. Beside the second aeration chamber 2 is arranged a settling chamber 3, in the immediate vicinity of which is arranged a disinfection chamber 4, which at the same time functions as a storage container. The integrated or combined disinfection chamber-storage container 4 is provided with three surface level sensors, a lower first surface level sensor 5, an upper second surface level sensor 6 and a high third surface level sensor 7. The apparatus further comprises a disinfection system, whereby dosage of disinfectant takes place from a disinfectant container 8 by means of a dosage pump 9.

The function of the surface level sensors and the dosage of disinfectant are controlled by the control center 10. The first and second surface level sensors 5 and 6 are employed primarily for the disinfection stage and the third surface level sensor 7 primarily for the storage stage, which will be discussed more in detail below.

Waste water is arranged to be supplied from a source of waste water 20 either to the first aeration chamber 1 through a supply pipe 21 or to the combined disinfection chamber-storage container 4 through a supply pipe 22.

Treated waste water is discharged by a pump 14 from the combined disinfection chamber-storage container 4 into the sea or a storage facility on land, e.g. a sewer network (not shown). Waste water can also be returned through a pipe connection 19, 25 to the first aeration chamber 1.

During normal operation, the shut-off valve 23 is open and the shut-off valve 24 is closed, so that waste water flows from the source of sewage 20 through the pipe 21 to the first aeration chamber 1. The waste water is transferred by way of overflow (shown by arrows) to the second aeration chamber 2 and further to the settling chamber 3, from where any undissolved particles may be returned to the first aeration chamber 1 through a pump 11 and a pipe 12 for renewed treatment. From the surface of the settling chamber 3, waste water is transferred by way of overflow (shown by arrow) to the combined disinfection chamber-storage container 4.

If the water can be discharged directly from the treatment plant (e.g., into the sea) and therefore no temporary storage is required, the actual disinfection process is controlled by the two lower sensors (i.e., the lower first surface level sensor 5 and the upper second surface level sensor 6). The control center 10 also controls the supply of disinfectant from the disinfectant container 8 to the lower part of the combined disinfection chamber-storage container 4 by the pump 9 by means of signals given by the surface level sensors 5, 6. The discharge of cleaned waste water from the combined disinfection chamber-storage container 4 is carried out in a controlled manner by the pump 14, whereby shut-off valve 17 is open and shut-off valve 18 is closed. In this case the disinfection process takes place in the lower part of the combined disinfection chamber-storage container 4. Discharge is generally initiated by a signal from the upper second surface level sensor 6.

If the situation requires that waste water has to be stored for a certain time, the function of the second surface level sensor 6 is by-passed and the storage stage is controlled by the high third surface level sensor 7. The above mentioned disinfection process can also be carried out in this connection. This advantageously provides for temporary storage of waste water within the combined chamber or container. The filling and discharge of the combined disinfection chamber-storage container 4 is thus generally monitored by the high third surface level sensor 7, which is connected to the central control center 10.

The waste water can also, when necessary, be returned from the combined disinfection chamber-storage container 4 to the first aeration chamber 1 through the pump 14 and the return pipe 19, which through a pipe connection 25 is connected to the sewage supply pipe 21. In this case shut-off valve 18 is open and shut-off valve 17 is closed. When waste water is returned to the aeration chamber in this manner, chemical disinfectant should not be added to the combined disinfection chamber-storage container, in order to secure the process. If disinfectant has been added, the waste water is returned in small portions. Control is carried out by the control center 10.

If it is desirable to by-pass the waste water treatment process, e.g. for maintenance or other reasons, waste water can be led from the source of waste water 20 through the supply pipe 22 directly to the combined disinfection chamber-storage container 4. In this case the waste water can at a later stage be led from the combined disinfection chamber-storage container 4 to the first aeration chamber 1 as described in the above paragraph.

Waste water can also be led untreated from the combined disinfection chamber-storage container 4 directly into the sea or a receiving facility on land, such as a sewer network (not shown), if so desired. Discharge into the discharge pipe 30 is carried out by the pump 14, whereby shut-off valve 17 is open and shutoff valve 18 is closed.

Figure 3:
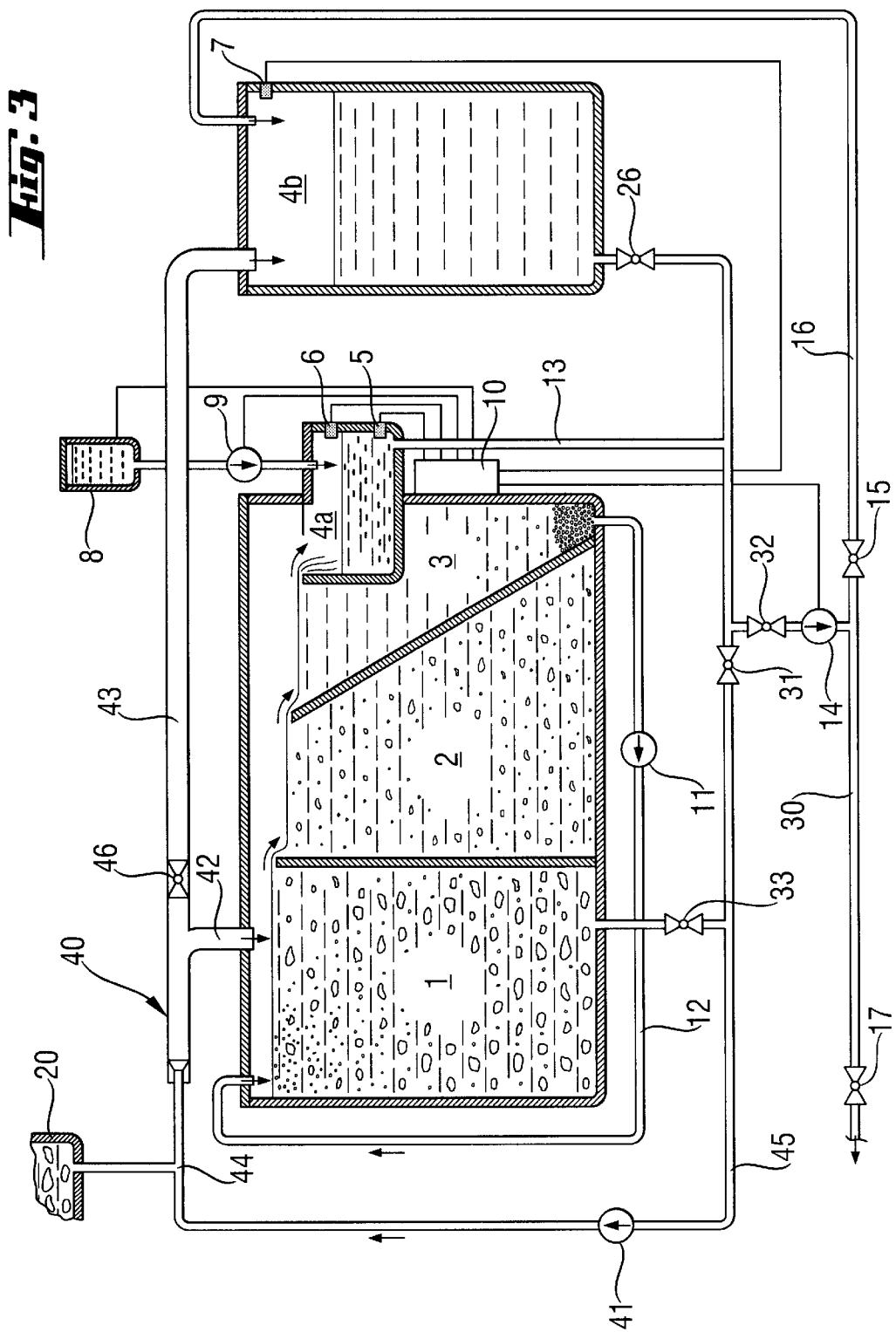
FIG. 3 is a partially schematic side elevation view showing a further embodiment of a system in which a disinfection chamber and a storage container are arranged as separate units.

A further embodiment of a sewage or waste water treatment plant is shown in FIG. 3 which substantially corresponds to the apparatus described in connection with FIG. 1. In this apparatus, however, the first aeration chamber 1 also functions as a collecting container for sewage or waste water. When necessary, such as during maintenance of the aeration chamber 1, the storage container 4b can directly function as a collecting container for sewage. These arrangements can also be implemented in connection with the embodiment shown in FIG. 1.

Next to the second aeration chamber 2 is arranged a settling chamber 3, in the immediate vicinity of which is arranged a disinfection chamber 4a, which is provided with a lower first surface level sensor 5 and an upper second surface level sensor 6. The apparatus further comprises a disinfection system, whereby dosage of disinfectant takes place from a disinfectant container 8 by means of a dosage pump 9. The function of the surface level sensors and the dosage of disinfectant are controlled by a control center 10.

The storage container 4a is integrated into the treatment plant, wherein it nonetheless forms a separate unit. Waste water is transferred from the disinfection chamber 4a to the storage container 4b through a pipe connection 13, 45. The storage container 4b is provided with a third surface level sensor 7 for monitoring the storing stage, which will be discussed below in more detail.

The waste water is arranged to be supplied from a source of sewage 20 by an ejector device 40 either to the first aeration chamber 1 through a supply pipe 42 or to the storage container 4b through a supply pipe 43. The ejector device 40 generates underpressure by means of the ejector pump 41 in the direction of the source of sewage 20 through a suction pipe connection 44, whereby waste water is transferred to the integrated or combined collecting container-aeration chamber 1 by way of the flow generated by the ejector pump 41. The function of the ejector device is not described in more detail in this connection since such devices are known to a person skilled in the art.

The treated waste water is discharged by a pump 14 from the storage container 4b into the sea or a storage facility on land, such as a sewer network (not shown). The waste water can also be returned through a pipe connection 45 to the first aeration chamber 1.

During operation, shut-off valve 46 is closed so that waste water is supplied from the source of sewage 20 through the pipe 42 (by means of the pressure differential and the flow generated by the ejector device 40 and the ejector pump 41) to the first aeration chamber 1. Waste water is transferred by way of overflow (shown by arrows) to the second aeration chamber 2 and further to the settling chamber 3, from where any undissolved particles may be returned to the first aeration chamber 1 through a pump 11 and a pipe 12 for renewed treatment. From the surface of the settling chamber 3, waste water is transferred by way of overflow (shown by arrow) to the disinfection chamber 4a.

If the water can be discharged from the treatment plant directly, such as into the sea or other receiving facility, no temporary storing stage is required and the actual disinfection process is controlled by the lower first surface level sensor 5 and the upper second surface level sensor 6. The central control center 10 also controls the supply of disinfectant from the disinfectant container 8 to the disinfection chamber 4a by the pump 9 by means of signals given by the surface level sensors 5, 6. The discharge of cleaned waste water from the disinfection chamber 4a is carried out in a controlled manner through the discharge pipe 13 and the pump 14 to a discharge pipe 30, whereby shut-off valves 17 and 32 are open and shut-off valves 15, 26 and 31 closed.

The disinfection chamber 4a is usually of a smaller size (as schematically indicated in FIG. 3) suitable for the disinfection process. Discharge from the disinfection chamber 4a is generally initiated by a signal from the upper second surface level sensor 6.

If the situation requires that waste water has to be stored for a certain time, such as when the ship is in the harbor, the waste water is led through the pipe connection 13, 16 to the storage container 4b, where the surface level of the collected waste water is controlled by a third surface level sensor 7. In this case shut-off valves 15 and 32 are open and shut-off valves 26, 31 and 17 are closed. This provides for a temporary storage stage as mentioned above, whereby the storage container 4b usually is sized according to an estimated need. The filling and discharge of the storage container 4b is thus generally monitored by the third surface level sensor 7, which also is connected to the central control center 10.

Waste water can also be returned from the storage container 4b for renewed treatment to the first aeration chamber 1 through a circulation pipe 45, the ejector pump 41 and the supply pipe 42. In this case shut-off valves 26 and 31 are open and shut-off valves 32 and 46 closed.

If it is desirable to by-pass the waste water treatment process, such as for maintenance or other reasons, the waste water can be led from the source of waste water 20 through the ejector device 40 and the supply pipe 43 directly to the storage container 4b. In this case the waste water can at a later stage be led from the storage container 4b to the first aeration chamber 1 as described in the above paragraph.

Waste water can also be led untreated either from the combined collecting container-aeration chamber 1 or the storage container 4b directly into the sea or a receiving facility on land, such as a sewer network (not shown).

From the combined collecting container-aeration chamber 1, discharge is carried out into the discharge pipe 30 by the pump 14, whereby shut-off valves 33, 31, 32, and 17 are open and shut-off valves 15 and 26 are closed. From the storage container 4b discharge is carried out by the pump 14, whereby shut-off valves 17, 26, and 32 are open and shut-off valves 15 and 31 are closed.

Figure 4:
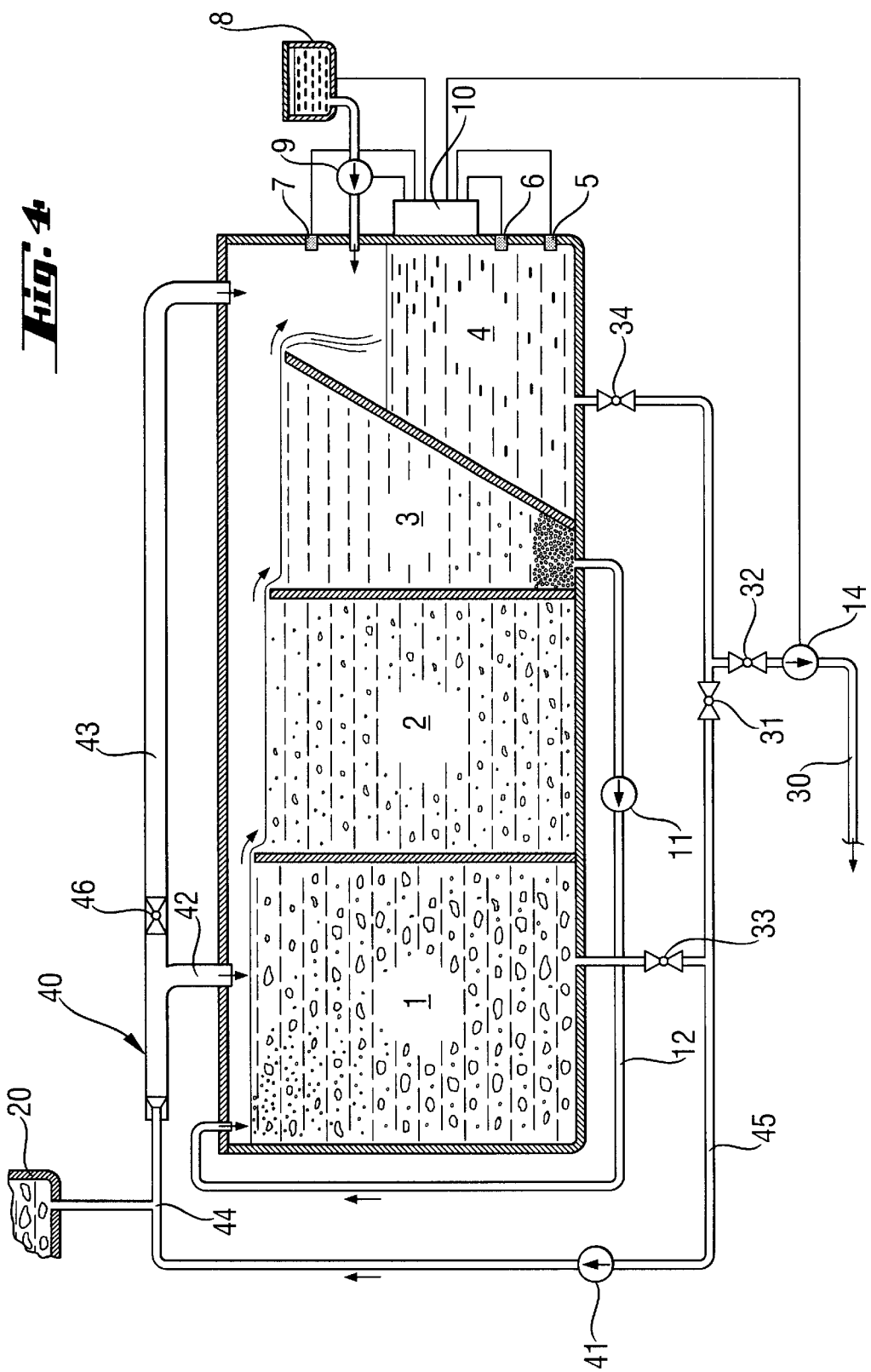
FIG. 4 is a partially schematic side elevation view showing a yet another embodiment of a system in which a disinfection chamber and a storage container are arranged as an integrated unit.

Yet another embodiment of a sewage or waste water treatment plant is shown in FIG. 4 that substantially corresponds to the embodiment of FIG. 2. In this embodiment, however, the first aeration chamber 1 also functions as a collecting container for sewage or waste water. When necessary, such as during maintenance of the aeration chamber 1, the combined disinfection chamber-storage container 4 can directly function as a collecting container for sewage. These arrangements can also be implemented in connection with the embodiment shown in FIG. 2.

Next to the second aeration chamber 2 is arranged a settling chamber 3, in the immediate vicinity of which is arranged a disinfection chamber 4, which at the same time functions as a storage container. The integrated or combined disinfection chamber-storage container 4 is provided with three surface level sensors, a lower first surface level sensor 5, an upper second surface level sensor 6 and a high third surface level sensor 7. The apparatus further comprises a disinfection system, whereby dosage of disinfectant takes place from a disinfectant container 8 by means of a dosage pump 9.

The function of the surface level sensors and the dosage of disinfectant are controlled by the control center 10. The first and second surface level sensors 5 and 6 are employed primarily for the disinfection stage and the third surface level sensor 7 primarily for the storage stage, which will be discussed more in detail below.

Waste water is arranged to be supplied from a source of sewage 20 by an ejector device 40 either to the first aeration chamber 1 through a supply pipe 42 or to the combined disinfection chamber-storage container 4 through a supply pipe 43. The ejector device 40 generates underpressure by means of the ejector pump 41 in the direction of the source of sewage 20 through a suction pipe connection 44, whereby waste water is transferred to the integrated or combined collecting container-aeration chamber 1 by way of the flow generated by the ejector pump 41. The function of the ejector device is not described in more detail in this connection since such devices are known to a person skilled in the art.

The treated waste water is discharged by a pump 14 from the combined disinfection chamber-storage container 4 into the sea, a harbor basin, or a storage facility on land, such as a sewer network (not shown). The waste water can also be returned through a pipe connection 45 to the first aeration chamber 1.

In operation, waste water is supplied from the source of sewage 20 through the pipe 42 by means of the pressure differential and the flow generated by the ejector device 40 and the ejector pump 41, shut-off valve 46 closed, to the first aeration chamber 1. Waste water is transferred by way of overflow (shown by arrows) to the second aeration chamber 2 and further to the settling chamber 3, from where any undissolved particles may be returned to the first aeration chamber 1 through a pump 11 and a pipe 12 for renewed treatment. From the surface of the settling chamber 3, waste water is transferred by way of overflow (shown by arrow) to the combined disinfection chamber-storage container 4.

If the water can be directly discharged from the treatment plant, such as into the sea or other receiving facility, the actual disinfection process is controlled by the lower first surface level sensor 5 and the upper second surface level sensor 6. The control center 10 also controls the supply of disinfectant from the disinfectant container 8 to the combined disinfection chamber-storage container 4 by the pump 9 by means of signals given by the surface level sensors 5, 6. The discharge of cleaned waste water from the combined disinfection chamber-storage container 4 is carried out in a controlled manner by the pump 14 to a discharge pipe 30, whereby shut-off valves 32 and 34 are open and shut-off valve 31 is closed. In this case, the disinfection process takes place in the lower part of the combined disinfection chamber-storage container 4. Discharge is generally initiated by a signal from the upper second surface level sensor 6.

If the situation requires that waste water has to be stored for a certain time, the function of the second surface level sensor 6 is by-passed and the storage stage is controlled by the high third surface level sensor 7. The above mentioned disinfection process can be carried out also in this connection. This advantageously provides for temporary storage within the combined chamber or container, as mentioned above. The filling and discharge of the combined disinfection chamber-storage container 4 is thus generally monitored by the high third surface level sensor 7, which is connected to the central control center 10.

The waste water can also, when necessary, be returned from the combined disinfection chamber-storage container 4 for renewed treatment to the first aeration chamber 1 through a circulation pipe 45, the ejector pump 41, and the supply pipe 42. In this case shut-off valves 34 and 31 are open and shut-off valves 32 and 46 closed.

If it is desirable to by-pass the waste water treatment process, such as for maintenance or other reasons, the waste water can be led from the source of waste water 20 through the ejector device 40 and the supply pipe 43 directly to the combined disinfection chamber-storage container 4. In this case, the waste water can at a later stage be led from the combined disinfection chamber-storage container 4 to the first aeration chamber 1 as described in the above paragraph. Waste water can also be led untreated either from the combined collecting container-aeration chamber 1 or from the combined disinfection chamber-storage container 4 directly into the sea or a receiving facility on land, such as a sewer network (not shown).

From the combined collecting container-aeration chamber 1, discharge is carried out into the discharge pipe 30 by the pump 14, whereby shut-off valves 33, 31, and 32 are open and shut-off valve 34 is closed. From the combined disinfection chamber-storage container 4, discharge is carried out by the pump 14, whereby shut-off valves 34 and 32 are open and shut-off valve 31 is closed.

The shut-off valves in the above described examples are advantageously motor actuated, whereby their control is connectable to the central control center 10, to which also the function of the other components and operating means of the apparatus can be connected.

The integrated arrangement is also well exemplified in the above embodiments by, for example, the multifunctional pump 14, which is controlled by the central control center 10. The disinfection system may as an alternative also comprise an arrangement for UV-light or UV-radiation. It is also clear that the apparatus may function with only one aeration chamber as an alternative to the two chambers indicated in the above embodiments.

The foregoing detailed description has been given for clearness of understanding only, and no unnecessary limitations should be understood therefrom, as modifications would be obvious to those skilled in the art.

What is claimed is:

1. Apparatus for treatment of sewage on a vessel, comprising:
   a control center;
   a first aeration chamber;
   a settling chamber;
   a disinfection chamber; and
   a storage container,
   wherein the aeration chamber, the settling chamber, the disinfection chamber, and the storage container are integrated into a single structure with the disinfection chamber and the storage container arranged as separate units;
   wherein the disinfection chamber includes a first surface level sensor and a second surface level sensor for primarily monitoring a disinfection stage, and the storage container includes a third surface level sensor for primarily monitoring a storage stage, and
   wherein at least one of the surface level sensors is connected to the control center.

2. The apparatus of claim 1, further comprising a second aeration chamber.

3. The apparatus of claim 2, in which the first aeration chamber and the storage container are provided with sewage supply pipes connected to a source of sewage.

4. The apparatus of claim 3, in which the supply pipes connected to the first aeration chamber and the storage container are connected to an ejector device.

5. The apparatus of claim 4, in which the first aeration chamber and the storage container are arranged to function directly as sewage collecting containers.

6. The apparatus of claim 1, in which the disinfection chamber and the storage container are provided with a pump means connected to the control center.

7. The apparatus of claim 1, in which the disinfection chamber is provided with a disinfection system connected to the control center.

8. The apparatus of claim 7, in which the disinfection system comprises a disinfectant container and a dosage pump.

9. Apparatus for treatment of sewage on a vessel, comprising:
   a control center;
   a first aeration chamber;
   a settling chamber;
   a disinfection chamber; and
   a storage container,
   wherein the aeration chamber, the settling chamber, the disinfection chamber, and the storage container are integrated into a single structure with the disinfection chamber and the storage container integrated into a combined disinfection chamber-storage container;
   wherein the combined disinfection chamber-storage container includes a first surface level sensor and a second surface level sensor for primarily monitoring a disinfection stage, and a third surface level sensor for primarily monitoring a storage stage; and
   wherein at least one of the surface level sensors is connected to the control center.

10. The apparatus of claim 9, further comprising a second aeration chamber.

11. The apparatus of claim 10, in which the first aeration chamber and the storage container are provided with sewage supply pipes connected to a source of sewage.

12. The apparatus of claim 11, in which the supply pipes connected to the first aeration chamber and the storage container are connected to an ejector device.

13. The apparatus of claim 12, in which the first aeration chamber and the storage container are arranged to function directly as sewage collecting containers.

14. The apparatus of claim 9, in which the disinfection chamber and the storage container are provided with a pump means connected to a control center.

15. The apparatus of claim 9, in which the disinfection chamber is provided with a disinfection system connected to the control center.

16. The apparatus of claim 15, in which the disinfection system comprises a disinfectant container and a dosage pump.

* * * * *